(12) United States Patent
Hensley et al.

(10) Patent No.: US 10,418,754 B2
(45) Date of Patent: Sep. 17, 2019

(54) HOUSING AIR VENT FOR ELECTRONIC EQUIPMENT

(71) Applicant: HEWLETT PACKARD ENTERPRISE DEVELOPMENT LP, Houston, TX (US)

(72) Inventors: James D. Hensley, Roseville, CA (US); Chadi Farid Theodossy, Roseville, CA (US); David R. Cowles, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/778,932

(22) PCT Filed: Nov. 30, 2015

(86) PCT No.: PCT/US2015/062943
§ 371 (c)(1),
(2) Date: May 24, 2018

(87) PCT Pub. No.: WO2017/095368
PCT Pub. Date: Jun. 8, 2017

(65) Prior Publication Data
US 2018/0358753 A1    Dec. 13, 2018

(51) Int. Cl.
*H01R 13/648* (2006.01)
*H01R 13/659* (2011.01)
(Continued)

(52) U.S. Cl.
CPC ........... *H01R 13/659* (2013.01); *H04Q 1/035* (2013.01); *H01R 24/64* (2013.01)

(58) Field of Classification Search
CPC ................................. H05K 7/20; H01R 13/659
(Continued)

(56) References Cited

U.S. PATENT DOCUMENTS 6,604,964 B2 * 8/2003 Hoshino .............. H01R 13/518
439/607.55
6,629,859 B2 * 10/2003 Hoshino .............. H01R 13/658
439/607.25

(Continued)

FOREIGN PATENT DOCUMENTS

JP          2011044144 A       3/2011

OTHER PUBLICATIONS

International Search Report & Written Opinion received in PCT Application No. PCT/US2015/062943, dated Sep. 12, 2016, 12 pages.

*Primary Examiner* — Neil Abrams
(74) *Attorney, Agent, or Firm* — Hewlett Packard Enterprise Patent Department (57) ABSTRACT

In some examples, an apparatus includes electronic equipment and a port assembly electrically coupled to the electronic equipment. The port assembly can include a port to receive a plug as well as an electromagnetic interference (EMI) grounding member disposed on the periphery of the port assembly. The apparatus can further include a housing to securely house the equipment. The housing can include a panel with a panel opening for the port assembly. The panel opening can include a vent portion to permit air venting for the electronic equipment through the vent portion of the panel when a plug is plugged into the port.

14 Claims, 7 Drawing Sheets

(51) Int. Cl.
*H04Q 1/02* (2006.01)
*H01R 24/64* (2011.01)

(58) Field of Classification Search
USPC .................. 439/495, 485, 607.2, 607.21, 439/607.25–607.26
See application file for complete search history.

(56) References Cited

U.S. PATENT DOCUMENTS

| | | | | |
|---|---|---|---|---|
| 6,666,719 | B1 * | 12/2003 | Kuroi | H01R 9/032 |
| | | | | 439/607.19 |
| 7,073,960 | B2 * | 7/2006 | Anderl | H04B 10/806 |
| | | | | 361/688 |
| 8,512,076 | B2 * | 8/2013 | Zhang | H01R 13/6596 |
| | | | | 439/607.23 |
| 8,545,268 | B2 * | 10/2013 | Fogg | H01R 13/6587 |
| | | | | 439/607.25 |
| 8,591,258 | B2 * | 11/2013 | Xiao | H01R 13/6581 |
| | | | | 439/541.5 |
| 8,613,632 | B1 * | 12/2013 | Nichols | H01R 13/6587 |
| | | | | 439/485 |
| 8,678,862 | B2 * | 3/2014 | Peng | H04L 12/10 |
| | | | | 439/485 |
| 8,894,438 | B2 * | 11/2014 | Schmitt | H01R 13/659 |
| | | | | 439/540.1 |
| 8,964,385 | B2 * | 2/2015 | Lam | H05K 7/20727 |
| | | | | 174/377 |
| 9,411,383 | B2 * | 8/2016 | Gong | G06F 1/181 |
| 2008/0123292 | A1 | 5/2008 | Wobig et al. | |
| 2011/0292602 | A1 | 12/2011 | Narasimhan et al. | |
| 2014/0098492 | A1 | 4/2014 | Lam et al. | |
| 2014/0273547 | A1 | 9/2014 | Green et al. | |
| 2018/0358753 | A1 * | 12/2018 | Hensley | H01R 13/659 |

\* cited by examiner

HOUSING AIR VENT FOR ELECTRONIC EQUIPMENT

BACKGROUND

Excess heat generated by electrical equipment can, in some situations, cause electronic components to not perform correctly, corrupt data on electronic components, damage electronic components, and/or other consequences. Such consequences can be of special concern for electrical equipment in controlled airflow environments, such as certain data centers, cellular towers, and the like, which can be designed to house a large number of heat generating equipment, such as computer servers, network switches, and other computing devices.

BRIEF DESCRIPTION OF THE DRAWINGS

For a detailed description of various examples, reference will now be made to the accompanying drawings in which.

DETAILED DESCRIPTION

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. In the following discussion and in the claims, the terms "including" and "comprising" are used in an open-ended fashion, and thus should be interpreted to mean "including, but not limited to."

As described above, excess heat generated by heat-generating equipment in a data center or other environments can, in some situations, cause electronic components to not perform correctly, corrupt data on electronic components, damage electronic components, and/or other consequences. As a result, many types of heat-generating equipment employ air inlet and exhaust venting, such as one or more vent openings in the housing of the equipment, to provide a path for cooling air to flow through the product. In some equipment, surface area suitable for the placement of vent openings on the equipment may be limited (e.g., a rear panel of a 48-port network switch) and may be shared with labeling, connectors, modules, module slots, light-emitting diodes (LEDs), buttons, etc., which can lead to designers modifying equipment housing (or other aspects of the equipment) to enlarge the housing or otherwise modify the housing or device to accommodate a larger number of vent openings. For example, in some electronic equipment, fan speed can be increased in order to provide adequate air flow due to otherwise inadequate venting, which can lead to increased energy use and costs.

Certain implementations of the present disclosure are designed to address the above issues. For example, in some implementations an apparatus can include electronic equipment and a port assembly electrically coupled to the electronic equipment. The port assembly can, for example, include a port to receive a plug and an electromagnetic interference (EMI) grounding member disposed on the periphery of the port assembly. This example apparatus can further include a housing to securely house the equipment, with the housing including a panel with a panel opening for the port assembly. The panel opening can, for example, include a vent portion to permit air venting for the electronic equipment through the vent portion of the panel even when a plug is plugged into the port.

Certain implementations of the present disclosure can enhance the effectiveness of the vent openings by creating inlet paths around plugs that are plugged into the port. The vent portions can, for example, be manufactured along with existing openings in the panel that are already punched (or otherwise present in the panel), to accommodate the plugs. In some implementations, the vent openings are strategically placed to allow air to enter without compromising the effectiveness of EMI grounding around the plugs. Other advantages of implementations presented herein will be apparent upon review of the description and figures.

Figure 1:
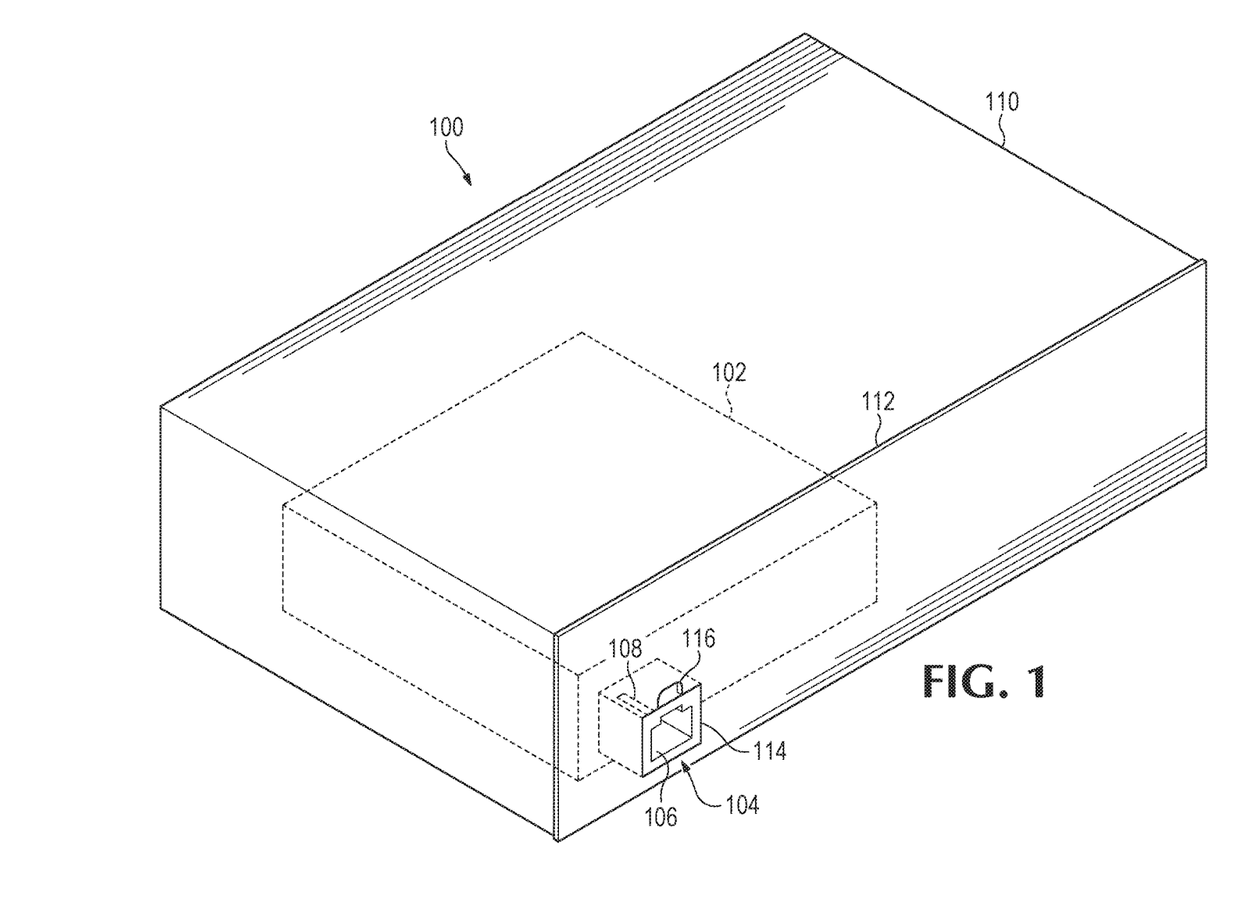
FIG. 1 is a perspective view of an apparatus, according to an example.

FIG. 1 illustrates an example apparatus 100. As described in further detail below, apparatus 100 can for example be in the form of a network switch or other suitable equipment that is designed to receive one or more plugs. Apparatus 100 includes electronic equipment 102 and a port assembly 104 electrically coupled to electronic equipment 102. Port assembly 104 includes a port 106 to receive a plug and an electromagnetic interference (EMI) grounding member 108 disposed on the periphery of port assembly 104. Apparatus 100 further includes a housing 110 to securely house equipment 102. Housing 110 includes a panel 112 with a panel opening 114 for port assembly 104. Panel opening 114 can, for example, include a vent portion 116 to permit air venting for equipment 102 through vent portion 116 of panel 112 when a plug is plugged into port 106. Further information regarding various components of apparatus 100 is provided in further detail below.

It is appreciated that apparatus 100 can be any suitable type of apparatus that includes electronic equipment, a port assembly, and a housing. As but a few examples, apparatus 100 can be in the form of certain data center equipment, such as storage hardware, server hardware, networking hardware, and/or any suitable combination thereof. Networking hardware can, for example, broadly refer to equipment that is able to connect devices together on a computer network, by using packet switching to receive, process, and/or forward data to a destination device, and can, for example, include devices such as switches, routers, gateways, etc. In some implementations, apparatus 100 can be in the form of a network switch that uses hardware addresses to process and forward data at the data link layer (e.g., layer 2 of the Open Systems Interconnection (OSI) model). In some implementations, apparatus 100 can be an apparatus to process data at the network layer (e.g., layer 3 of the OSI mode) by incorporating routing functionality that can, for example, use Internet Protocol (IP) addresses to perform packet forwarding. It is appreciated that apparatus 100 can, for example, be in the form of a layer-3 switch or multilayer switch.

Additional examples of suitable forms of apparatus 100 can include stand-alone machines, such as a personal computer, server, desktop computer, laptop, printer, etc. As an example, apparatus 100 can be in the form of a desktop computer including a monitor for presenting information to an operator and a keyboard and mouse for receiving input from an operator. As another example, apparatus 100 can be in the form of a standalone storage server appliance. It is further appreciated that in some implementations, apparatus 100 can be in the form of a converged system (which can also be referred to as "converged infrastructure", "unified computing", "fabric-based computing", "dynamic infrastructure," etc.). Such an apparatus can, for example operate by grouping multiple hardware components (e.g., data center servers, storage devices, and networking equipment), along with software (e.g., software for management and automation) into a single, optimized computing package.

As provided above, apparatus 100 can, for example, include electronic equipment 102 and a port assembly 104 electrically coupled to electronic equipment 102. Electronic equipment 102 can, for example, be in the form of any suitable electronic equipment that can be coupled directly or indirectly to port assembly 104. It is appreciated that at least when equipment 102 is receiving electrical current it can be considered heat generating equipment due to electrical resistance within equipment 102. Vent portion 116 can, for example, provide a path for cooling air to flow through apparatus 100 and to cool equipment 102 as well as other heated equipment within apparatus 100. That is, it is appreciated that apparatus 100 can include multiple pieces of heat generating equipment beyond just equipment 102.

In some implementations, equipment 102 is in the form of a network interface controller. Such a network interface controller can, for example and in some implementations, include a plurality of ports 106 to receive a plurality of electrical connector plugs. It is appreciated that electronic equipment 102 can be in forms other than a network interface controller. For example, in some implementations, equipment 102 can, for example, be in the form of a processor, memory, storage device, network switch, I/O controller, Peripheral Component Interconnect (PCI) card, server, and/or any suitable heat generating component thereof that can be electrically connected to port assembly 104.

As provided above, apparatus 100 can, for example, include port assembly 104 electrically coupled to electronic equipment 102. Port assembly 104 can be electrically coupled to electronic equipment 102 via any suitable coupling to allow electrical signals and/or powers to be transmitted therebetween. Suitable electrical couplings can, for example, include one or more electrical wires that connect port assembly 104 and electronic equipment 102, a circuit board with electrical leads printed thereon that connects, an inductive coupling mechanism, etc.

Figure 5:
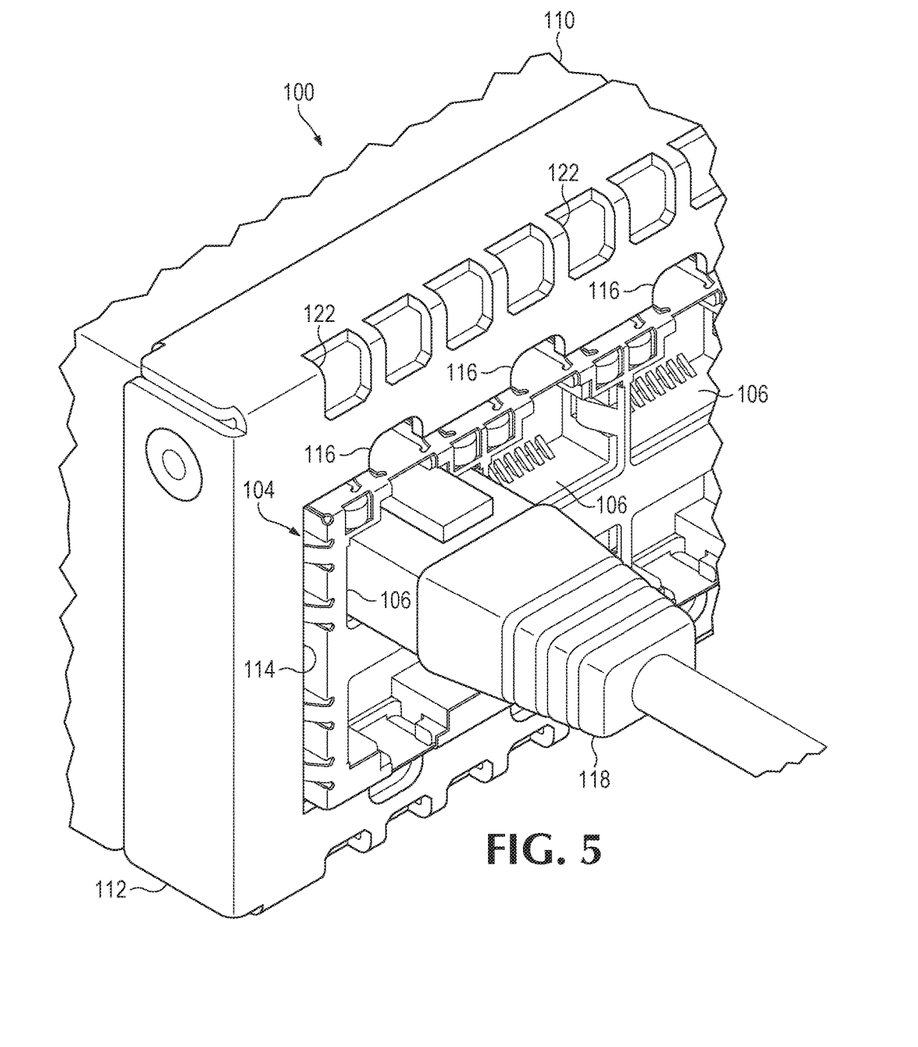
FIG. 5 is the enlarged view of FIG. 3 with an example plug plugged into a port of the example apparatus of FIG. 2.

As provided above, port assembly 104 includes a port to receive a plug (an example plug is shown in FIG. 5). As used herein, the term "plug" can, for example, refer to any suitable electrical connector to join electrical circuits as an interface using a mechanical assembly. The connection can in some implementations be temporary, with the plug being easily removable by a user, such as for example an Ethernet plug. In some implementations, a tool may be used for assembly and removal. In some implementations, the plug is in the form of a data plug, such as for example an Ethernet plug, RJ-45 plug, or Fiber Optic plug. In some implementations, the plug is in the form of a power plug, such as for example an Alternating Current (AC) plug.

As shown for example in FIG. 2-8, in some implementations, apparatus 100 can include multiple port assemblies 104 (such as for example a network switch with multiple ports, such as an 8-, 16-, 24-, or 48-port switch). In such an implementation, the multiple port assemblies 104 includes multiple ports 106 each of which is to receive a respective plug (such as the plug shown for example in FIG. 5). Moreover, as shown for example in FIG. 2-8, in some implementations, apparatus 100 can include a first row of port assemblies 104 disposed above a second row of port assemblies 104. In some implementations, apparatus 100 can include three rows of multiple port assemblies 104. As another example, in some implementations, apparatus 100 can include port assemblies on multiple sides of apparatus 100. It is appreciated that other suitable arrangements of multiple port assemblies 104 can be provided for apparatus 100.

As provided above, port assembly 104 includes an EMI grounding member 108 disposed on the periphery of port assembly 104. In some implementations, EMI grounding member 108 can, for example, be in the form of a cantilever finger. It is appreciated that EMI grounding member 108 can be in another shape, orientation, or arrangement than the example shown in FIG. 1.

Figure 2:
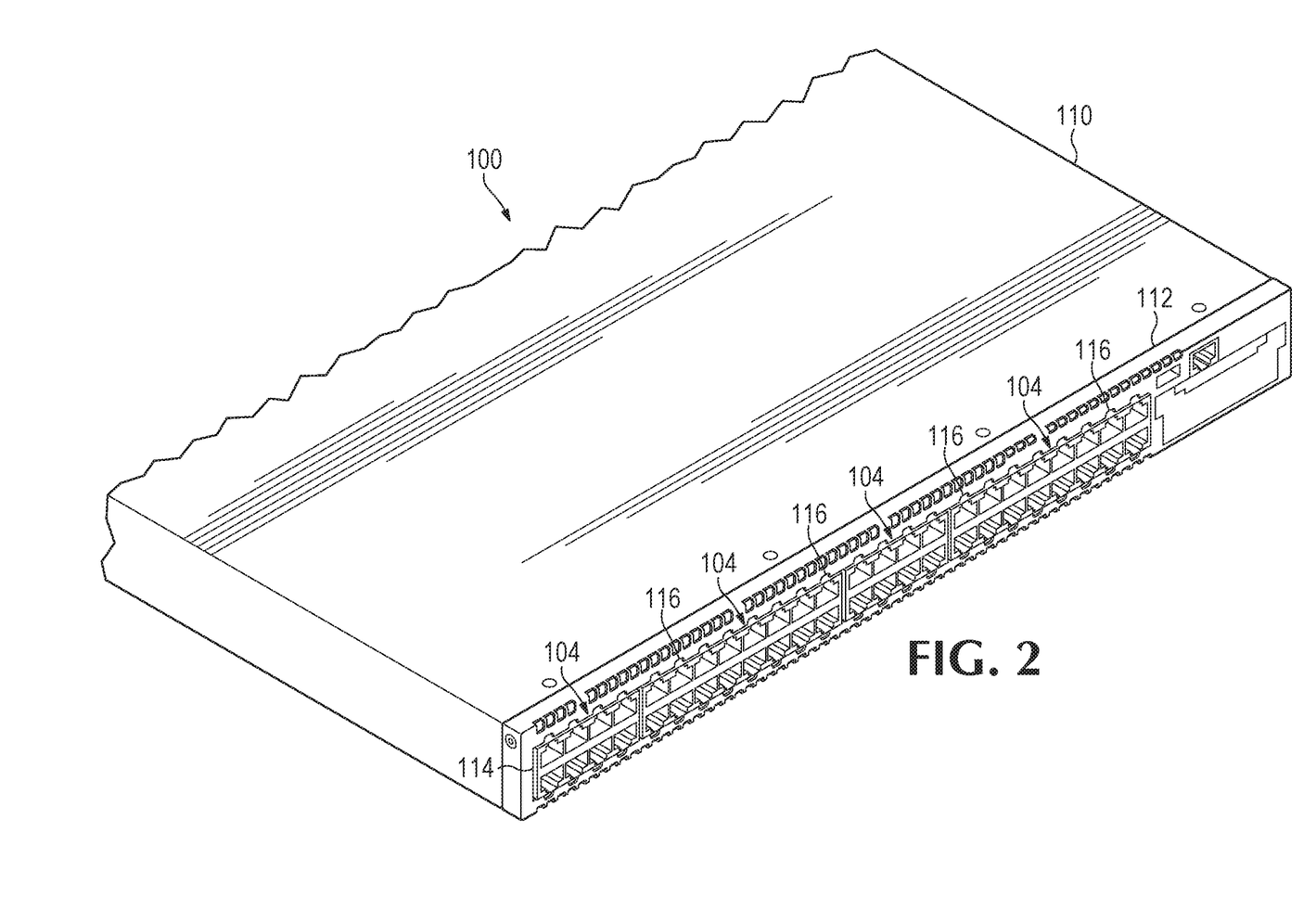
FIG. 2 is a perspective view of an apparatus, according to another example.

As provided above, apparatus 100 includes a housing 110 to securely house equipment 102. Certain components of example housing 110 are removed from FIG. 1 or shown partially transparent or with cut-outs in order to show interior components of apparatus 100. For example, one implementation of upper housing of apparatus 100 is not shown in FIG. 1, whereas another implementation of upper housing is depicted in FIG. 2. Likewise, one implementation of panel 112 is shown as partially transparent in FIG. 1, and another implementation of panel 112 is shown normally in FIG. 2 and partially cut-out in FIG. 4. Additional figures depicting various views of another implementation of housing 110 are shown in FIGS. 2-8 and are described in detail below.

Housing 110 includes a panel 112 (or other housing component) that includes an opening 114 to permit access to or otherwise expose port 106 to receive a plug. For illustration, the present disclosure will refer to the housing component as a "panel." However, it is appreciated that the housing component/panel can be in any suitable form for housing equipment 102 of apparatus. For example, in some implementations, the housing component is a single piece of material that surrounds equipment 102. It is further appreciated that the housing component may be flat, bent, curved, or another suitable shape to house equipment 102 and allow access to port 106. In some implementations, the housing component may include multiple panels and that likewise, panel 112 may be made of multiple pieces of material removably or irremovably joined together. Moreover, panel 112 itself may be flat, bent, curved, or another suitable shape. One implementation of a panel 112 having a bent shape is shown for example in FIG. 8.

As provided above, panel 112 includes an opening 114 to permit access to or otherwise expose port 106. In some implementations, panel 112 can be a front facing panel (e.g., a panel covering a front end of a network switch), a lateral side facing panel, a rear facing panel, a top facing panel, a bottom facing panel, any combination thereof, or any other suitable location or position on apparatus 100. For example, in some implementations, panel 112 can extend from the rear of apparatus 100 around a lateral side of apparatus 100 and to the front of panel 112. In such an implementation, panel 112 can for example include a first rear opening 114 for a first rear port assembly 104, a second lateral side opening 114 for a second lateral side port assembly 104, and a third front opening 114 for a third front port assembly 104.

As depicted in FIG. 1, opening 114 can include a vent portion 116 to permit air venting for electronic equipment 102 through vent portion 116 when a plug is plugged into port 106. Such venting can allow for the design of a variety of air flow directions (e.g. side-to-side cooling, front-to-back cooling, etc.). In some implementations, such as the implementation shown in FIG. 5, vent portion 116 can be positioned to allow air to vent over a plug secured in port assembly 104. It is appreciated that as used herein, the term "vent over" does not necessarily imply that air is vented "above" the plug. Instead, the term can in some implementations refer to air being vented beneath, on a lateral side of, or some other suitable surface of the plug. It is further appreciated that the dimensions and location of vent portion 116 can be based on one or more design factors relevant to the electronic equipment. For example, in some implementations, vent portion 116 is positioned to avoid interfering with EMI grounding of port 106 when plug is plugged into port 106. Likewise, in some implementations, vent portion 116 is sized to provide suitable EMI shielding for electronic equipment. For example, in some implementations, such as that depicted in FIG. 1, a width of vent portion 116 may be smaller than a width of a plug, and the width of vent portion 116 may be selected based on frequencies emitted from the electronic equipment 102 in order to provide proper EMI shielding for apparatus 100. Other design factors for sizing and position of vent portions 116 may include objectives of maximizing a vent percentage open area while also maintaining EMI enclosure integrity and to maximize an amount of remaining structural sheet metal. Such remaining sheet metal may be used to provide sufficient chassis strength as well as to allow for fabrication of a robust punching tool or other manufacturing tool. Additional design factors for sizing and position of vent portions 116 may include providing enough panel surface area to allow for labeling, connectors, modules or module slots, light-emitting diodes (LEDs), buttons, etc.

Figure 3:
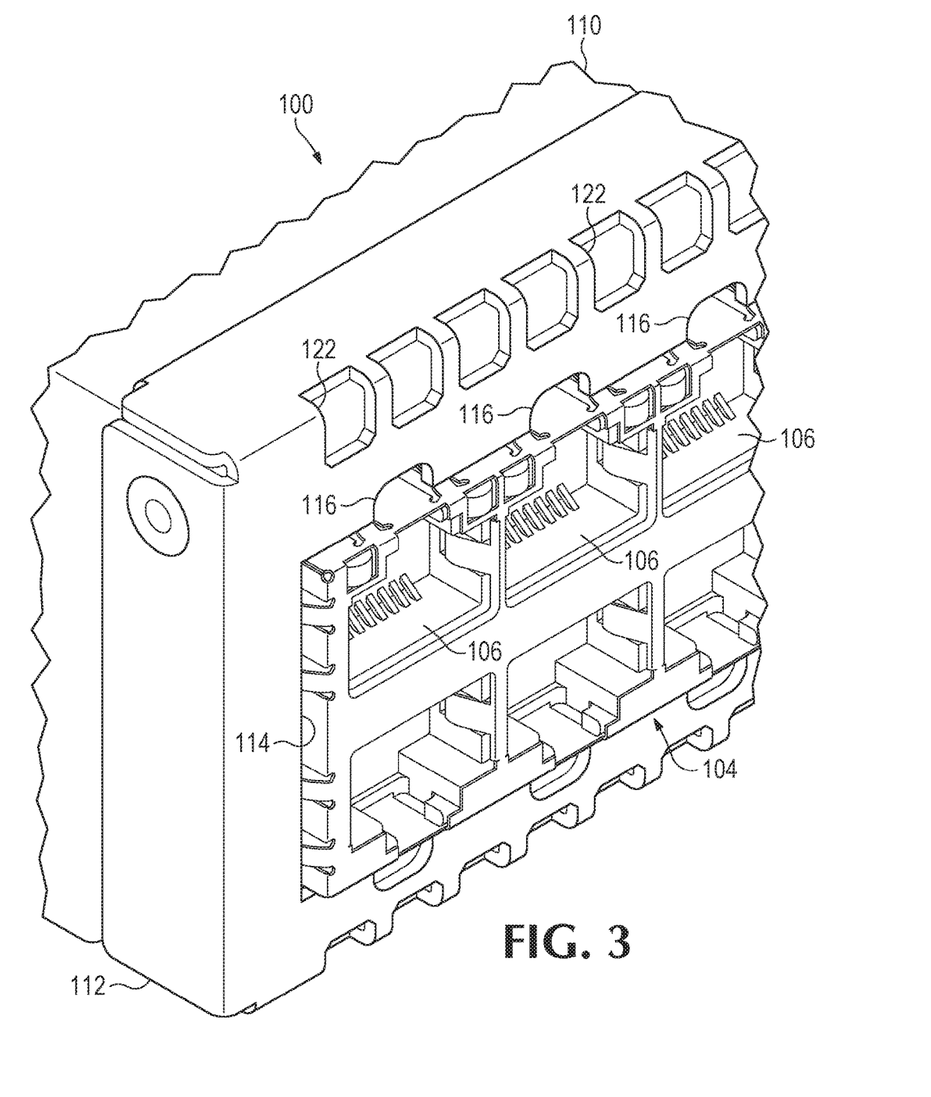
FIG. 3 is an enlarged view of a portion of the example apparatus of FIG. 2.
Figure 4:
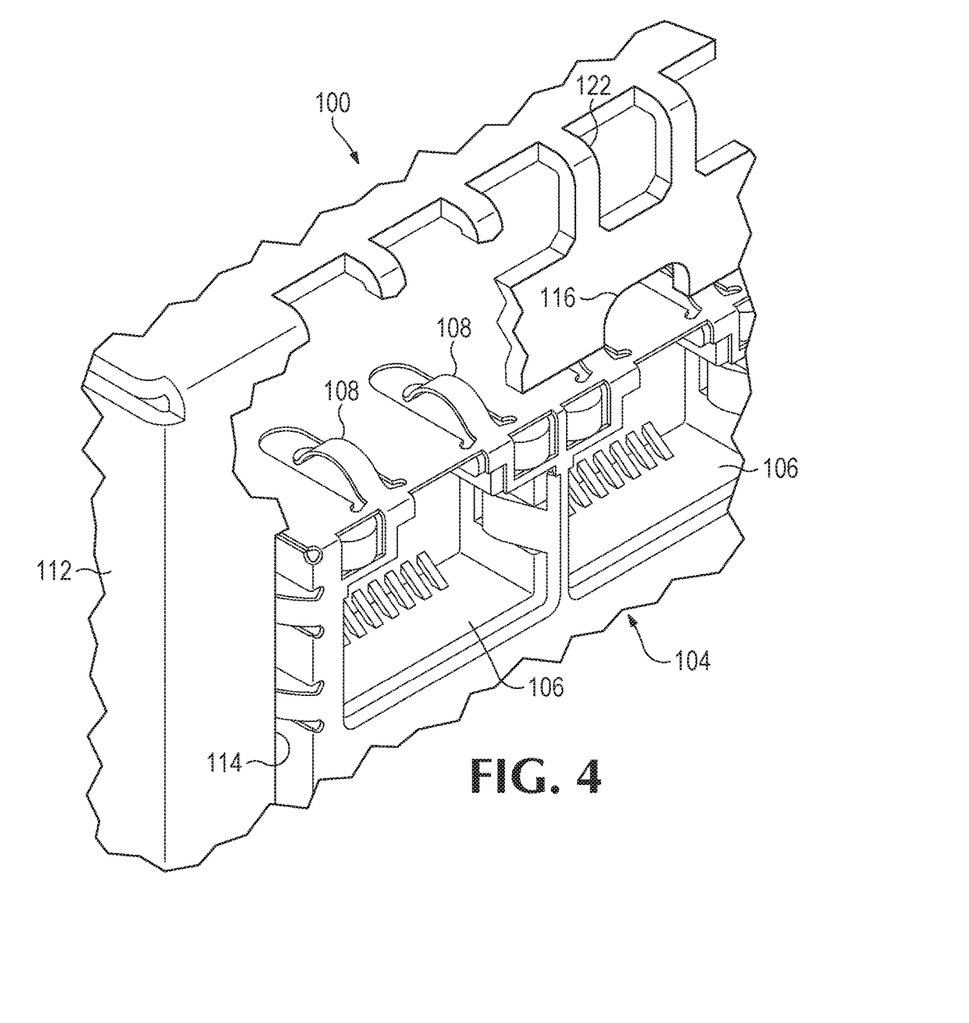
FIG. 4 is the enlarged view of FIG. 3 with a portion of a panel removed to show interior details of the example apparatus of FIG. 2.
Figure 6:
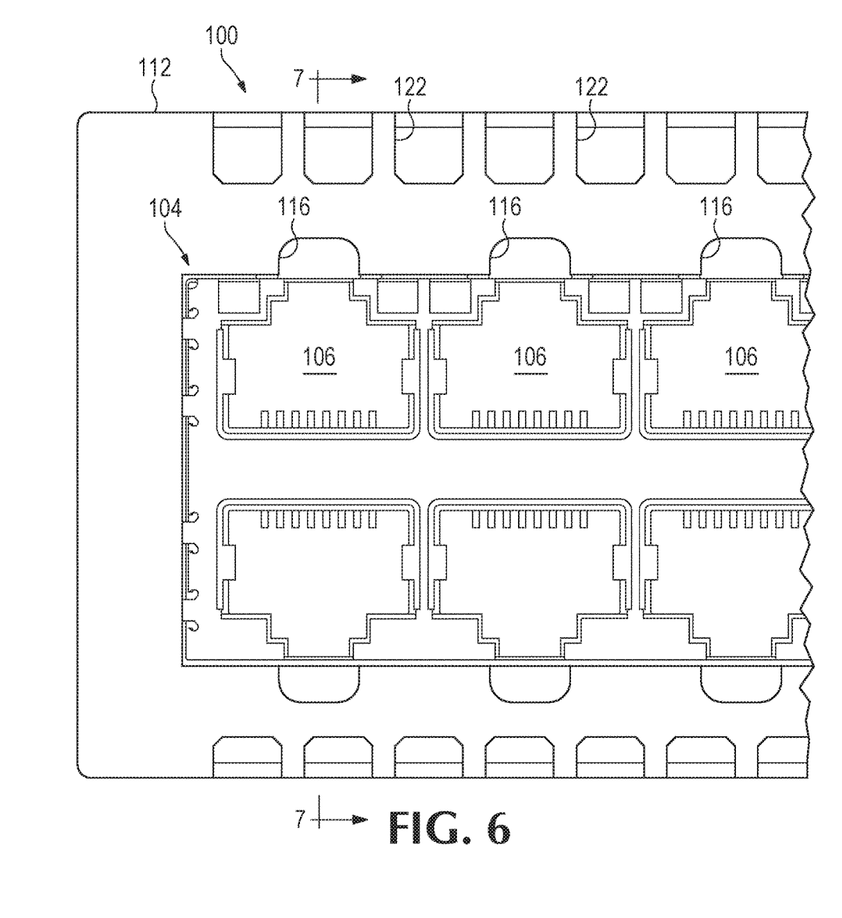
FIG. 6 is a front view of the example apparatus of FIG. 2.
Figure 7:
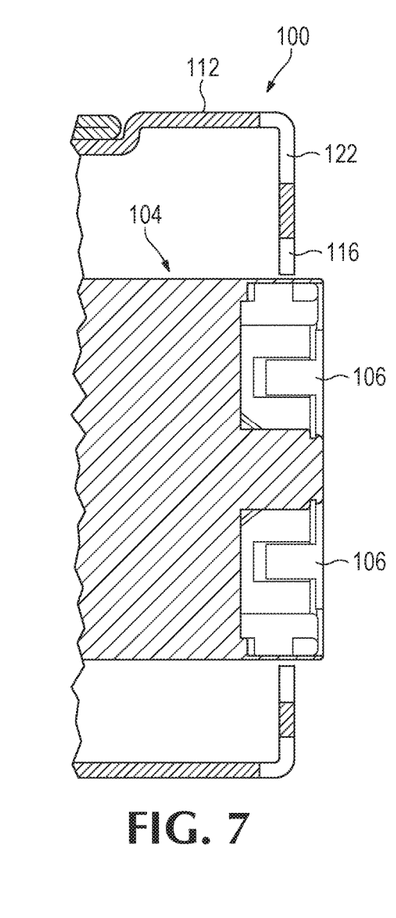
FIG. 7 is a cross-sectional view of the example apparatus of FIG. 2 along line 6-6 of FIG. 6.
Figure 8:
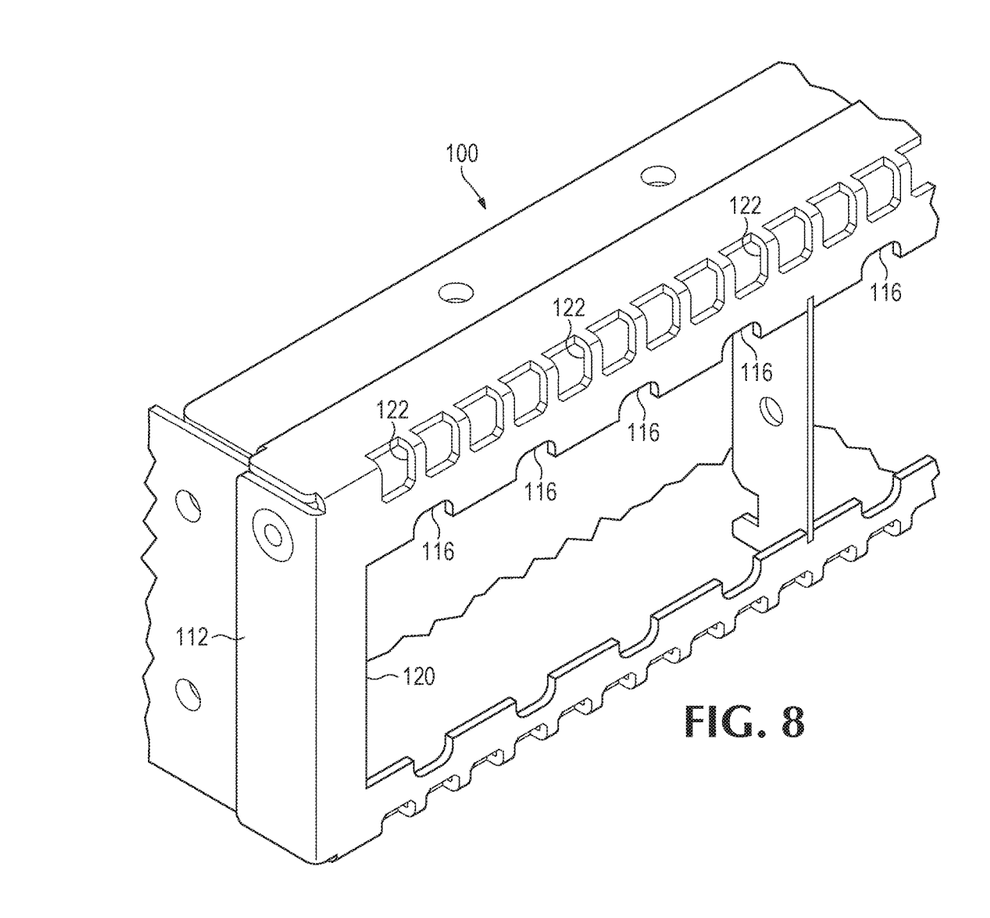
FIG. 8 is a perspective view of the example apparatus of FIG. 2 with interior components removed to show aspects of the housing.

FIGS. 2-8 depict various views of another implementation of apparatus 100. In particular, FIG. 2 is a perspective view of apparatus 100, FIG. 3 is an enlarged view of a portion of apparatus 100, FIG. 4 is the enlarged view of FIG. 3 with a portion of panel 112 removed to show interior details of apparatus 100, FIG. 5 is the enlarged view of FIG. 3 with an example plug 118 plugged into port 106 of apparatus 100, FIG. 6 is a front view of apparatus 100, FIG. 7 is a cross-sectional view of apparatus 100 along line 6-6 of FIG. 6, and FIG. 8 is a perspective view of apparatus 100 with interior components removed to show aspects of housing 110.

For illustration, various aspects of the apparatus of FIG. 1 are referred to with respect to the apparatus of FIGS. 2-8 and common reference numbers are used between the figures. It is appreciated that aspects of the apparatus of FIG. 1 can be implemented in the apparatus of FIGS. 2-8 and vice versa. As but one example, the description of suitable electronic equipment 102 for use with the apparatus of FIG. 1 can be applied to the apparatus of FIGS. 2-8. However, the use of common reference numbers are for illustration and are not intended to suggest that one or more aspects of the various apparatuses described herein are required in other implementations.

Apparatus 100 of FIGS. 2-8 is in the form of a network switch that includes (among other components) a plurality of ports 106 to receive respective plugs 118 and an outer housing 110 including an opening 114 to expose the plurality of ports 106. In this implementation, opening 114 includes a main portion 120 (see, e.g., FIG. 8) that substantially follows the footprint of the plurality of ports 106 and respective vent portions 116 that extend beyond the footprint of the plurality of ports 106 to provide air venting for electronic equipment of the network switch.

In this example implementation, vent portions 116 for a first row of port assemblies 104 are disposed above the first row of port assemblies 104 and vent portions 116 for a second row of port assemblies 104 are disposed below the second row of port assemblies (in an attempt to clearly show the apparatus of FIGS. 2-8 and to avoid redundancy, only a few of the 48 port assemblies, components thereof, and other aspects of apparatus 100 are labelled). It is appreciated, however, that other suitable arrangements of multiple port assemblies 104 can be provided for apparatus 100. For example, as provided above with respect to FIG. 1, apparatus 100 can in some implementations include three rows of multiple port assemblies 104. As another example, in some implementations, apparatus 100 can include port assemblies on different sides of apparatus 100.

As provided above, apparatus 100 of FIGS. 2-8 includes a plurality of port assemblies 104 to receive a plurality of plugs. Each port assembly includes respective EMI grounding members 108 disposed on the periphery of each port assembly 104. The apparatus of FIGS. 2-8 includes a housing 110 including a panel 112 with a single panel opening 114 for the plurality of port assemblies 104, wherein the panel opening includes a vent portion to permit air venting for the electronic equipment through the vent portion of the panel when a plug is plugged into the port. In this implementation, each vent portion 116 is located adjacent to and between two EMI grounding members 108 (see, e.g., FIG. 4).

In some implementations where apparatus 100 includes multiple port assemblies 104, panel opening 114 can be in the form of a single panel opening 114 for all of the port assemblies (as shown for example in FIG. 8). In some implementations, the multiple port assemblies 104 can be part of a single piece of equipment, whereas in other implementations, the multiple port assemblies 104 can, for example, be multiple pieces of equipment secured together, multiple pieces of equipment that are separately housed within apparatus 100, or another suitable arrangement. In some implementations, panel 112 can include multiple openings for the multiple port assemblies. Likewise, in some implementations, housing 110 may include multiple panels 112 with each of the multiple panels 112 including its own panel opening 114 for a respective port assembly 104. In some implementations, panel 112 (or other components of housing 110) includes additional panel openings 122 separate from vent portions 116 to permit further air venting for apparatus 100. As described for example with respect to the implementations of vent portions 116 of FIG. 1, the dimensions and location of additional panel openings 122 can be based on one or more design factors relevant to the electronic equipment. For example, in some implementations, additional panel openings 122 are sized to provide suitable EMI shielding for electronic equipment and the selection of suitable sizes may be based on frequencies emitted from the electronic equipment 102 in order to provide proper EMI shielding for apparatus 100.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

It is appreciated that the choice of materials for the parts of apparatus 100 can be informed by the requirements of mechanical properties, temperature sensitivity, moldability properties, or any other factor apparent to a person having ordinary skill in the art. For example, one more of the parts (or a portion of one of the parts) can be made from suitable plastics, such as a suitable thermoplastic, suitable metals, and/or other suitable materials. For example, in some implementations, one or more components of housing 110 (e.g., panel 112) are made of a suitable metal that can be designed to securely housing equipment 102 while minimizing the emittance of EMI from apparatus 100.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An apparatus comprising:
    electronic equipment;
    a port assembly electrically coupled to the electronic equipment, wherein the port assembly includes a port to receive a plug, and wherein the port assembly includes an electromagnetic interference (EMI) grounding member disposed on the periphery of the port assembly;
    a housing to securely house the equipment, wherein the housing includes:
        a panel including a panel opening for the port assembly, wherein the panel opening includes a vent portion to permit air venting for the electronic equipment through the vent portion of the panel when a plug is plugged into the port, wherein a width of the vent opening is smaller than a width of the plug.

2. The apparatus of claim 1,
    wherein the apparatus includes multiple port assemblies,
    wherein the multiple port assemblies includes multiple ports each of which is to receive a respective plug,
    wherein the panel includes a single panel opening for the multiple port assemblies, and
    wherein the single panel opening includes separate vent portions for each of the multiple port assemblies to permit air venting for the electronic equipment through the vent portions of the panel.

3. The apparatus of claim 1,
    wherein the apparatus includes a first row of port assemblies disposed above a second row of port assemblies,
    wherein the vent portions for the first row of port assemblies are disposed above first row of port assemblies, and
    wherein the vent portions for the second row of port assemblies are disposed below the second row of port assemblies.

4. The apparatus of claim 1, wherein the port is to receive an Ethernet plug.

5. The apparatus of claim 1, wherein the port is to receive a Fibre Channel plug.

6. The apparatus of claim 1, wherein the vent portion is located adjacent to and between two EMI grounding members.

7. The apparatus of claim 1, wherein the EMI grounding member is in the form of a cantilever finger.

8. The apparatus of claim 1, wherein the vent opening is positioned to allow air to vent over a plug secured in the port assembly.

9. The apparatus of claim 1, wherein the panel includes a second panel opening separate from the panel opening for the port assembly to permit further air venting for the electronic equipment through the panel.

10. The apparatus of claim 1, wherein the apparatus is in the form of a network switch.

11. A network switch comprising:
    a plurality of ports to receive respective plugs;
    an outer housing, wherein the outer housing includes an opening to expose the plurality of ports,
    wherein the opening includes a main portion that substantially follows the footprint of the plurality of ports and respective vent portions that extend beyond the footprint of the plurality of ports to provide air venting for electronic equipment of the network switch, wherein a width one vent portion is smaller than a width of a plug.

12. The network switch of claim 11, wherein the vent portions are positioned to avoid interfering with electromagnetic interference (EMI) grounding of the plurality of ports.

13. A computing device comprising:
    a network interface controller, wherein the network interface controller includes a plurality of ports to receive a plurality of electrical connector plugs; and
    a housing component for the computing device, wherein the housing component includes an opening to permit access to the plurality of ports,
    wherein the opening includes vent portions extending therefrom to allow air venting of electronic equipment of the computing device through the housing component when the plurality of electrical connector plugs are plugged into the plurality of ports, wherein a width of the vent portions are smaller than a width of its respective port.

14. The computing device of claim 13, wherein the vent portion is sized to provide suitable electromagnetic interference (EMI) shielding for the computing device.

* * * * *